(12) United States Patent
Horsten et al.

(10) Patent No.: US 7,551,354 B2
(45) Date of Patent: Jun. 23, 2009

(54) MIRROR WITH BUILT IN DISPLAY

(75) Inventors: Jan B. A. M. Horsten, Eindhoven (NL);
Johannes Johanna Van Herk,
Eindhoven (NL); **Markus Cornelis
Jakobus Lazeroms**, Vroenhoven-Riemst
(BE)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 0 days.

(21) Appl. No.: 10/545,988

(22) PCT Filed: Feb. 9, 2004

(86) PCT No.: PCT/IB2004/050088

§ 371 (c)(1),
(2), (4) Date: Aug. 17, 2005

(87) PCT Pub. No.: WO2004/074886

PCT Pub. Date: Sep. 2, 2004

(65) Prior Publication Data

US 2006/0164725 A1    Jul. 27, 2006

(30) Foreign Application Priority Data

Feb. 20, 2003 (EP) ................... 03100400

(51) Int. Cl.
*G02B 27/28* (2006.01)
(52) U.S. Cl. ........................ 359/485; 359/609
(58) Field of Classification Search .......... 359/839, 359/849
See application file for complete search history.

(56) References Cited

U.S. PATENT DOCUMENTS

| 3,162,008 | A |   | 12/1964 | Berger et al. |
| 4,630,040 | A |   | 12/1986 | Haertling |
| 5,835,166 | A |   | 11/1998 | Hall et al. |
| 5,899,551 | A |   | 5/1999  | Neijzen et al. |
| 5,995,180 | A |   | 11/1999 | Moriwaki et al. |
| 6,106,121 | A |   | 8/2000  | Buckley et al. |
| 6,111,684 | A | * | 8/2000  | Forgette et al. ............ 359/267 |
| 6,147,934 | A |   | 11/2000 | Arikawa et al. |
| 6,385,139 | B1 | * | 5/2002 | Arikawa et al. ............ 368/239 |
| 7,221,363 | B2 | * | 5/2007 | Roberts et al. ............. 345/204 |
| 2002/0085155 | A1 | * | 7/2002 | Arikawa ..................... 349/129 |
| 2002/0089622 | A1 | * | 7/2002 | Kuroiwa et al. ............ 349/96 |
| 2002/0113937 | A1 | * | 8/2002 | Ouderkirk et al. .......... 349/187 |
| 2002/0176164 | A1 |   | 11/2002 | Motomura et al. |
| 2002/0180937 | A1 | * | 12/2002 | De Vaan et al. ............ 353/31 |

(Continued)

FOREIGN PATENT DOCUMENTS

EP        0825477 A2    2/1998

(Continued)

OTHER PUBLICATIONS

"Mirror with Built-in Display", U.S. Appl. No. 10/507,730, filed Apr. 14, 2005.

*Primary Examiner*—Lee Fineman

(57) ABSTRACT

A mirror device which can be simultaneously used for display purposes, based on e.g. an LCD display with a polarizing mirror placed in front of it. The polarizing mirror has the characteristics that it does not disturb the transmission of the light from the display, but does reflect the light from outside the area of the screen. The polarizing mirror is embedded in a conventional mirror.

16 Claims, 2 Drawing Sheets

U.S. PATENT DOCUMENTS

2003/0095331 A1* 5/2003 Bengoechea et al. ........ 359/494
2006/0028730 A1* 2/2006 V. Varaprasad et al. ...... 359/604

FOREIGN PATENT DOCUMENTS

| EP | 1256833 A2 | 11/2002 |
| GB | 2362494 A * | 11/2001 |
| JP | 2002122860 | 4/2002 |
| WO | WO 03/079318 | 9/2003 |

* cited by examiner

MIRROR WITH BUILT IN DISPLAY

The invention relates to mirror comprising a display device.

As examples one may think of large mirrors, like bathroom mirrors in which part of the mirror surface is used for display purposes. Other examples are medium sized mirrors, like outside mirrors for trucks, mirrors in shaving rooms, dressing-table mirrors or full-length mirrors in fitting rooms or even mirrored walls.

Such a mirror is described in the pending European Applications Serial number 02076069.2, filed on Mar. 18, 2002 and Serial number 02079306.3, filed on Oct. 17, 2002 (=PH NL 02.1038). The mirror function is obtained by introducing a polarizing mirror or reflective polarizer in stead of a partly reflecting layer in front of a display device.

Some disadvantages of this structure however are on the one hand that the reflectivity of the polarizer shows (slight) inhomogenities, both in color as in direction, resulting in color patterns and disturbed reflected images while the reflectivity of the polarizer also is limited (to approx. 50% which prohibits certain applications (such as automotive)).

On the other hand presently available reflective polarizers are limited in size, prohibiting applications in (very) large mirrors while also their cost is rather high, typically a multitude of the price of a normal mirror.

It is one of the objects of the invention to overcome at least partly the above-mentioned problem. To this end a mirror according to the invention comprises an at least partly reflecting layer and a polarizing mirror for viewing purposes comprising a display device.

A partly reflecting layer, when present in front of the display device, reduces the above mentioned inhomogenities. On the other hand a completely reflecting layer can be used outside the area of the display device when the mirror has a first part comprising a reflecting layer, and a second part at least partly transmitting light from the polarizing mirror.

Generally the polarizing mirror has a first plane reflecting light of a first kind of polarization to a viewing side, the mirror passing light of a second kind of polarization and being provided with a display device at its non-viewing side, which display device during use provides light of the second kind of polarization. The display device during use emits or reflects (polarized) light.

By "having a first plane reflecting light of a first kind of polarization" it is meant that a mirror plane acts as a polarizing plane. When in use, light within a certain range of a wavelength of light incident on a polarizing plane will be divided in two components one which is reflected by the polarizing plane and one of which passes through the polarizing plane. Generally most known is the division of light in two components having linearly polarized, perpendicular directions of polarization. On the other hand the light may be divided in right-handed and left-handed circular or elliptical polarization.

A first possible application of such a mirror is an interactive bathroom-mirror. This mirror displays (preferably personalised) information like news or weather forecast while the user is standing in front of the mirror while e.g. brushing teeth or shaving. For children the same or another display in said mirror can display interactive instructions (e.g. by means of cartoon-characters) while brushing teeth in order to learn (the timing for) brushing. The mirror can further be used for displaying television or movies during bathing or during haircutting.

Such a mirror can also be used as a handheld interactive device, such as a purse-mirror or in the automobile industry, where the dead-angle as viewed by a CCD-camera can directly be displayed in the rear-view mirror.

Preferably the mirror comprises an aperture in the reflecting layer at the area of the display device. A (thin) transflective layer within the aperture reduces the above mentioned inhomogenities again.

To prevent visibility of the display area and the "full mirror" area the reflectivity of the reflective layer at the edge of the aperture increases viewed in an outward directed direction from the aperture. Also a (decorative) cover of the edge area is possible.

A further embodiment has at its viewing side a further semi-transparent mirror.

These and other aspects of the invention are apparent from and will be elucidated with reference to the embodiments described hereinafter.

In the drawings:

FIG. 1 is a possible embodiment of a mirror device according to the invention, while

FIG. 4 is a diagrammatic cross-section of a part of another mirror device according to the invention while

The Figures are diagrammatic and not drawn to scale. Corresponding elements are generally denoted by the same reference numerals.

Figure 1:
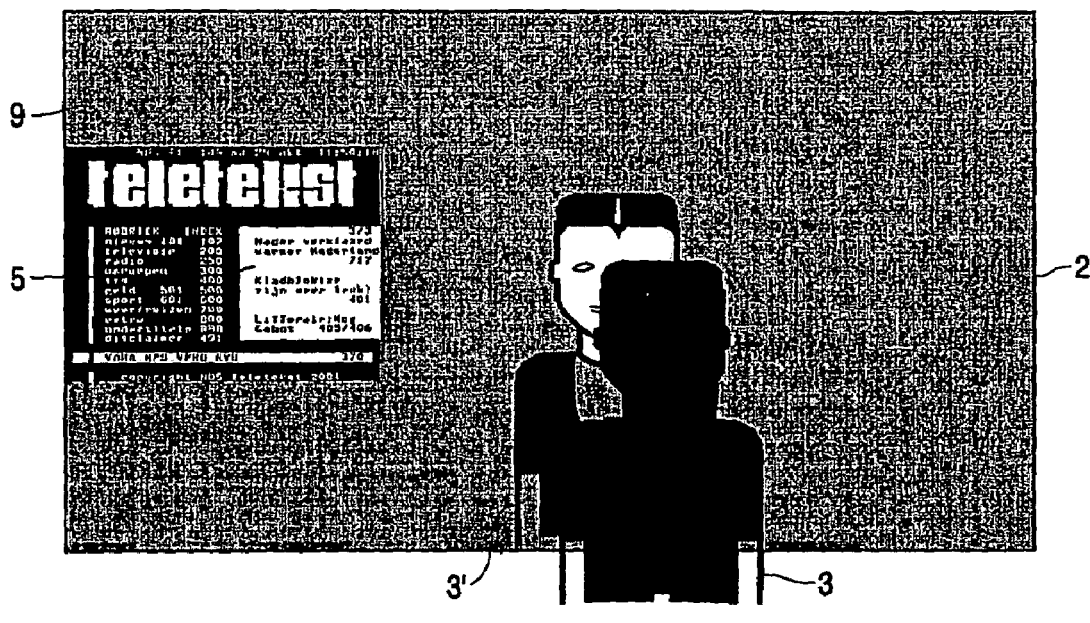

FIG. 1 shows a mirror device 1 for viewing purposes having a mirror 2 reflecting light, so a person 3 sees his image 3' (and further background, not shown). According to the invention the mirror has an aperture 9 in a reflective layer 8 provided on a glass substrate 4 (see also FIG. 2). Furthermore the mirror is provided with a display device 5 at its non-viewing side.

The display device 5 in this example is a liquid crystal display device having between two substrates (glass or plastic or any other suitable material) a liquid crystal material. Since most liquid crystal display devices are based on polarization effects the display 5 during use substantially emits polarized light. In general light from a backlight is modulated by the liquid crystal display effect. Since the liquid crystal display device is based on a polarization effect the display 5 comprises a first polarizer and a second polarizer (or analyzer), which passes light of a certain polarization (direction).

On the other hand in certain applications it may even be attractive to polarize light from e.g. an (O)LED or other display to obtain the effect of a high contrast of displayed information with respect to reflected images in mirror applications As discussed in the pending European Applications Serial number 02076069.2, filed on Mar. 18, 2002 and Serial number 02079306.3, filed on Oct. 17, 2002 (=PH NL 02.1038) the mirror function is obtained by introducing a polarizing mirror or reflective polarizer in which the mirror (plane) only reflects light of a first kind of polarization (direction) (substantially 50% reflection, indicated by arrow 14 in FIG. 2), but passes light of a second kind of polarization (direction) (100% transmission or emission, indicated by arrow 15 in FIG. 2) generated by the display 5.

Figure 2:
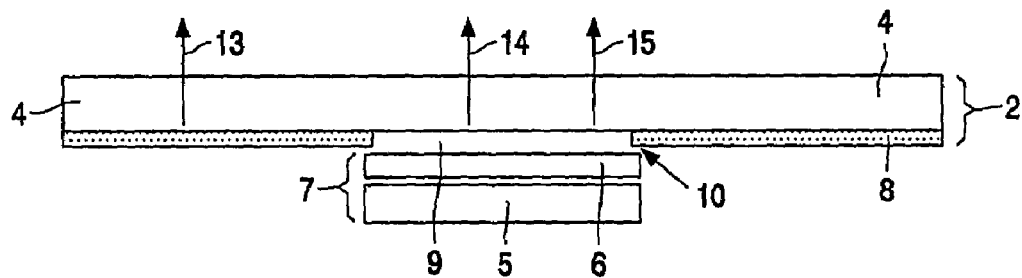
FIG. 2 is a diagrammatic cross-section of a part of a mirror device according to the invention.

The mirror display 7, comprising the display 5 and the polarizing mirror 6 is integrated or embedded in the mirror 2 which reflects substantially all light (radiation) (up to 100% transmission or emission, indicated by arrow 13 in FIG. 2).

Figure 3:
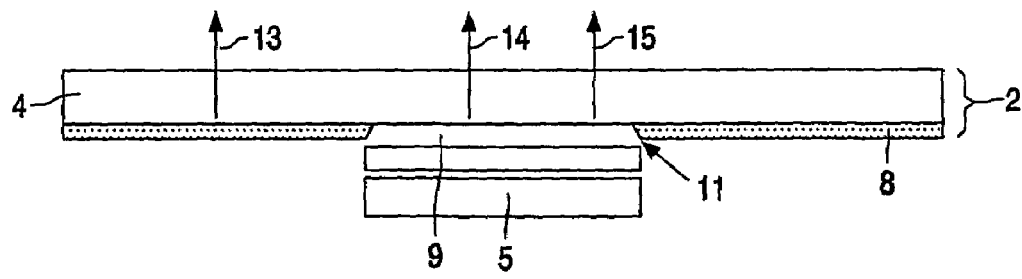
FIG. 3 show a modification of the mirror device according to FIG. 2.

In most applications the mirror 2 is (much) larger than the mirror display 7. Outside the display area, the mirror is a normal mirror. At the display area, the reflective layer is absent, such that the mirror display is visible. The reflective properties of both areas need not be the same. However, if the reflectivity (and other optical parameters such as color) of both areas are chosen the same, the transition will be less visible. FIG. 3 shows a further embodiment in which said transition is masked further. The reflectivity of the reflective layer 8 at the edge 11 of the aperture 9 increases viewed in an outward directed direction from the aperture. Optimal increase is reached over a distance between 1 mm and 20 mm. This can be obtained by either using a slanting edge 11 of the reflective layer 8 or by e.g. diminishing the concentration of reflective particles, when a reflective layer consisting of a composition of such reflective particles is used. In FIG. 3 the arrows 13, 14, 15 have the same meaning as in FIG. 2.

In the embodiment shown the perceived display brightness is optimal while at the same time the display area acts as a mirror when the display is off. Furthermore the mirror properties in the non-display area can be optimal for use as a mirror and the size of polarizing mirror can be limited to the display size (reducing cost and enabling large size mirrors).

Figure 4:
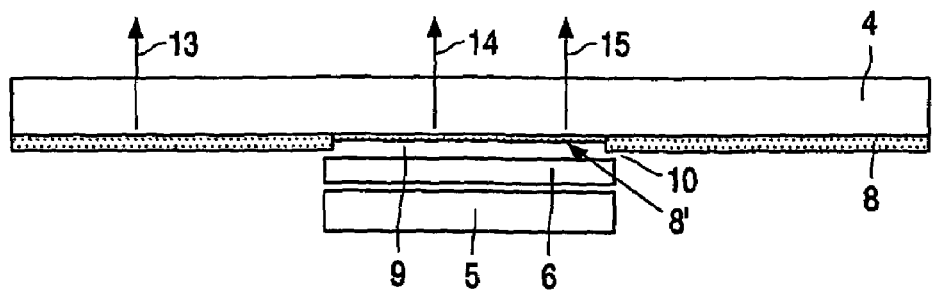
Figure 5:
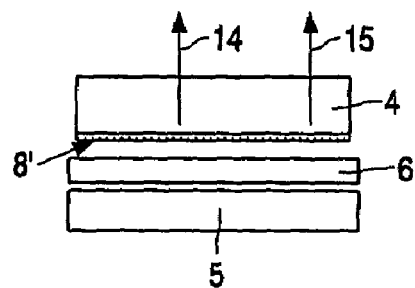
FIG. 5 shows another mirror device according to the invention and FIG. 6 is a diagrammatic cross-section of a part of another mirror device according to the invention.

In the embodiment of FIG. 4 a thin layer 8' of reflective/transflective material is situated within the aperture 9 (thinner then the layer 8 in the remaining part of the mirror 2). The mirror 2 now has two different areas, the display and the non-display area, each with a different transmission/reflectivity. The display area of the mirror 2 has a lower reflectivity and higher transmission than the non-display area. By adjusting the reflectivity and transmission of the display area a trade-off can be made between reflectivity (mirror functionality) and perceived display brightness. By choosing the reflectivity of the non-display-area the same as the combined reflection of front mirror (in the display area) and the polarizing mirror) the perceived difference between both areas can be minimized. Also other optical properties (such as color) can be matched. Especially for smaller mirrors the thin layer 8' of the reflective material may cover the full part of the mirror 2, as shown in FIG. 5. In FIGS. 4 and 5 the arrows 13, 14, 15 have a similar meaning as in FIGS. 2 and 3.

Figure 6:
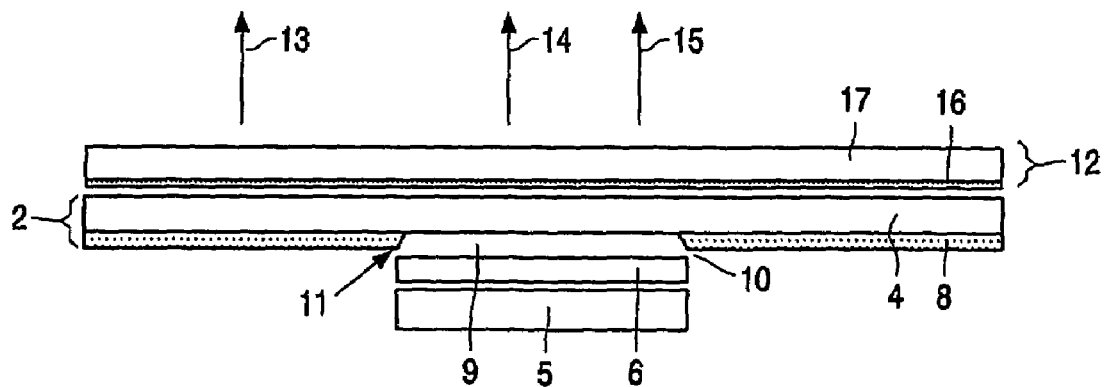

FIG. 6 finally shows a variation on the embodiment of FIG. 3, which comprises a further semi-transparent mirror 12 in front of the embodiment of FIG. 3, the mirror 12 having a partly reflective and partly transmissive layer 16 provided on a glass substrate 17. In this case two different alternatives are possible for the position of the reflective layer 8 of the locally transparent mirror 2. If placed at the side of the polarizing mirror 6 the visibility of the transition between display and non-display area will be minimized. If placed at the side of the semi-transparent mirror 12 parallax effects in the non-display area will be minimized.

The protective scope of the invention is not limited to the embodiments described. For instance more than one display can be integrated in the mirror, whereas many other applications areas can be thought of (rear view mirrors, fitting rooms, etcetera). Also in the embodiments of FIGS. 4 and 6 the reflectivity of the reflective layer 8 at the edge 11 of the aperture 9 may again increase, viewed in an outward directed direction from the aperture.

Furthermore the transition area (the edge) may be provided with a mask such as a colored strip or any other suitable design depending on the kind of application.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A mirror comprising:
an at least partly reflecting layer,
a polarizing mirror in a first area of the mirror through which a display device can be viewed, and
an aperture in the reflecting layer at the first area of the mirror,
wherein the reflecting layer covers a second area of the mirror, and the first area is configured to transmit light from the polarizing mirror.

2. The mirror of claim 1, including the display device, wherein:
the polarizing mirror includes a first plane for reflecting light of a first kind of polarization to a viewing side, the polarizing mirror passing light of a second kind of polarization, and
the display device is situated at a non-viewing side of the polarizing mirror and provides light of the second kind of polarization.

3. The mirror of claim 1, including a transflective layer within the aperture.

4. The mirror of claim 3, including the display device.

5. The mirror of claim 1, wherein reflectivity of the reflective layer at an edge of the aperture increases in a direction away from the aperture.

6. The mirror of claim 1, including, at a viewing side of the mirror, a semi-transparent mirror.

7. The mirror of claim 1, wherein an edge of the aperture is hidden.

8. The mirror of claim 1, including the display device.

9. A mirror comprising:
a transparent substrate,
a reflective layer on a surface of the substrate,
an aperture in the reflective layer,
a polarizing mirror situated at the aperture, and
a display device that is configured to be viewed through the polarizing mirror;
wherein:
the polarizing mirror is configured to reflect light having a first polarization and pass light having a second polarization, and
the display device is configured to provide light of the second polarization.

10. A mirror comprising:
a transparent substrate,
a reflective layer on a surface of the substrate,
an aperture in the reflective layer,
a polarizing mirror situated at the aperture, and
a display device that is configured to be viewed through the polarizing mirror;
wherein the reflective layer is configured to provide a reflectivity at an edge of the aperture that increases in a direction away from the aperture.

11. The mirror of claim 10, including a transflective layer at the aperture.

12. The mirror of claim 10, including a semi-transparent mirror that is situated at a surface of the substrate opposite the surface that includes the reflective layer.

13. A mirror comprising:
a transparent substrate,
a reflective layer on a surface of the substrate,
an aperture in the reflective layer, and
a polarizing mirror situated at the aperture, wherein the reflective layer is configured to provide a reflectivity at an edge of the aperture that increases in a direction away from the aperture.

14. The mirror of claim 13, including a transflective layer at the aperture.

15. A mirror comprising:
a transparent substrate,
a reflective layer on a surface of the substrate,
a semi-transparent mirror that is situated at a surface of the substrate opposite the surface that includes the reflective layer,
an aperture in the reflective layer, and
a polarizing mirror situated at the aperture.

16. A mirror comprising:
a transparent substrate,
a first reflective layer on a surface of the substrate,
an aperture in the reflective layer,
a second reflective layer in the aperture that is substantially thinner than the first reflective layer; and
a polarizing mirror situated at the aperture.

* * * * *